United States Patent [19]

Andersson et al.

[11] Patent Number: 4,775,096

[45] Date of Patent: Oct. 4, 1988

[54] PACKING CONTAINER WITH OPENABLE SEAL-WEAKENED TOP CLOSURE

[75] Inventors: Thorbjörn Andersson, Södra Sandby; Peter Frisk, Malmö, both of Sweden

[73] Assignee: AB Tetra Pak, Lund, Sweden

[21] Appl. No.: 122,462

[22] Filed: Nov. 19, 1987

[30] Foreign Application Priority Data

Dec. 11, 1986 [SE] Sweden ................................ 8605317

[51] Int. Cl.⁴ ............................................. B65D 5/06
[52] U.S. Cl. ............................ 229/125.42; 206/631.3; 229/3.5 R; 428/35; 428/352; 428/532
[58] Field of Search ................... 229/125.42, 3.5 R; 206/621.1, 621.2, 631.2, 631.3; 428/35, 352, 532

[56] References Cited

U.S. PATENT DOCUMENTS

| | | | |
|---|---|---|---|
| 3,116,002 | 12/1963 | Crawford et al. | 206/631.3 |
| 3,270,940 | 9/1966 | Egleston et al. | 206/631.3 |
| 3,319,868 | 5/1967 | Huang et al. | 206/631.3 |
| 3,675,015 | 7/1972 | Geib | 206/631.3 |
| 3,722,780 | 3/1973 | MacEwen | 206/621.2 |
| 3,900,574 | 8/1975 | Warwick | 426/274 |
| 3,941,907 | 3/1976 | Klement et al. | 428/341 |
| 3,997,703 | 12/1976 | Nakashio et al. | 428/532 |
| 4,137,947 | 2/1979 | Bridgeford | 426/105 |
| 4,378,049 | 3/1983 | Hsu et al. | 166/295 |
| 4,533,600 | 8/1985 | Coughlan et al. | 428/352 |

FOREIGN PATENT DOCUMENTS 2322685 11/1974 Fed. Rep. of Germany ... 229/3.5 R

*Primary Examiner*—Stephen Marcus
*Assistant Examiner*—Gary E. Elkins
*Attorney, Agent, or Firm*—Burns, Doane, Swecker & Mathis

[57] ABSTRACT

A packing container (2) includes a container body consisting of side walls (3,4), an arbitrary bottom closure (5), and a top closed by a bellow-type folded and heat sealed closure so as to form a top closure of the gable-top type which can be unfolded to expose an emptying opening (25) in the form of a pouring spout. To facilitate this re-unfolding, certain portions of the surfaces which are heat-sealed to one another are coated within the area of the unfoldable part of the top closure with a seal-weakening composition which is based on an aqueous dispersion of a thermoplastics material, preferably polythene, which is modified by a carboxymethyl cellulose, preferably sodium carboxymethyl cellulose.

2 Claims, 2 Drawing Sheets

PACKING CONTAINER WITH OPENABLE SEAL-WEAKENED TOP CLOSURE

FIELD OF THE INVENTION

The present invention relates generally to packing containers and, more particularly, to a top closure arrangement for packing containers.

BACKGROUND OF THE INVENTION

Packing containers with openable bellow-type folded top closure, which may be either ridgelike upright or more or less flat, constitute an example of well-known consumer packages of non-returnable character for liquid contents such as milk and similar dairy products. The packages are manufactured customarily with the help of modern, high-capacity packing machines which form, fill and close the finished packages. It is required of these consumer packages that they should be inexpensive, easy to distribute and handle and, not least, easy to open, so that the contents can readily be made accessible when desired.

A large group of non-returnable packages, for e.g. milk, consist of a rigid carrier layer of paper or cardboard which at least on one side has a coating of a thermoplastic material which imparts to the package the required liquid-tightness and other desirable barrier characteristics, e.g. gas-tightness, and which at the same time makes possible tight and durable sealing joints, in that combined layers of plastic material are heated and at the same time pressed to one another, so that a fusing together of the surfaces of the combind plastic layers is obtained. Since most packages of this type during handling are at risk of coming into contact with moist media, it is customary, moreover, for the outsides of the packages too to be coated with a plastic layer preventing moisture from penetrating into the fibrous carrier layer which, on becoming moist, loses its mechanical rigidity and causes the package to feel soft and difficult to handle.

OBJECTS AND SUMMARY OF THE INVENTION

The problem with packing containers of the type described here has always been that of being able to convert and seal the top closure so that it is both sufficiently tight and at the same time readily openable. The problem is solved in accordance with the present invention in that opposite plastic surfaces within the area of the sealing fin intended for breaking open are covered at least partially with a seal-weakening composition which is based on an aqueous dispersion of a thermoplastics, preferably polythene, which is modified by a carboxymethyl cellulose, preferably sodium carboxymethyl cellulose. Such a composition is especially usable on packing containers which are intended for contents of the foodstuff type, since it contains components all of which are fully acceptable from a health point of view. Furthermore, the components possess practically the same densities thus making it very easy to produce a stable dispersion, which facilitates the application to the packing material. More over the fact that water is used as a dispersion medium for the composition renders the latter less risky environmentally and in respect of fire during handling than the non-water-based compositions known up to now. The seal-weakening capacity of the composition, which is due to the quantity of carboxymethyl cellulose used, may vary within very wide limits, but in accordance with the invention wholly satisfactory seal-weakenings are achieved, that is to say seals which on the one hand are sufficiently strong to endure the mechanical stresses to which the packing container is subjected in normal handling, and on the other hand are sufficiently weak to make possible an easy breaking open when the container is to be opened, at carboxymethyl cellulose concentrations of 60–95, in particular 85%, calculated on the total dry substance weight of the composition, and correspondingly 40–5, in particular 15%, polythene.

In accordance with the invention, a packing container is preferably of the type which is manufactured from a blank consisting wholly or partly of thermoplastic-coated cardboard which has been provided with a pattern of folding lines facilitating the fold-forming of the blank, and which by folding has been formed to a tubular container body, one end of which has been given an arbitrary bottom closure and the other end of which has been closed by bellow-type folding to form a top closure which below a sealing fin, formed from a foldable edge zone of the blank, has four rectangular top closure panels connected to the edge zone, two of the panels lying opposite one another, preferably are inclined towards one another, the other two of the panels being divided up into three triangular panels each, and being folded in below the sealing fin, with the tips of the two center triangular panels being directed towards one another to form bellow-type folds, the sealing fin, at least to the greater part, comprising four material layers, the thermoplastic-coated surfaces whereof, situated against one another, are joined to one another by a seal produced by means of pressure with simultaneous supply of heat, and where at least one of the top closure panels thus folded to a bellow-type fold can be unfolded to an emptying opening in the form of a pouring spout by breaking open the seal joining the material layers within an area of the sealing fin located above the said bellow-type fold.

BRIEF DESCRIPTION OF THE DRAWINGS

The invention will now be explained and described in greater detail with special reference to the attached drawing, wherein.

DETAILED DESCRIPTION OF A PREFERRED EMBODIMENT

Figure 1:
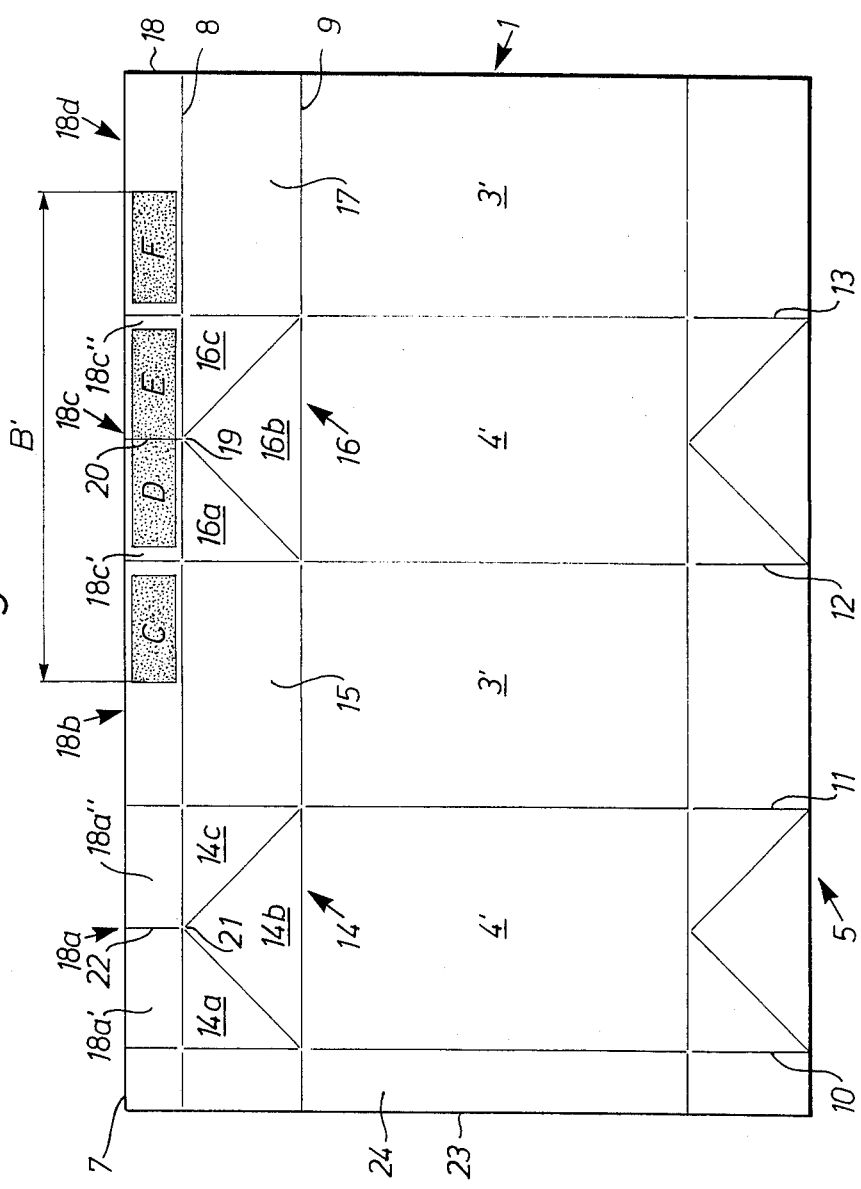
FIG. 1 is a schematic view of an initial blank intended for the manufacture of a packing container in accordance with the invention.
Figure 2:
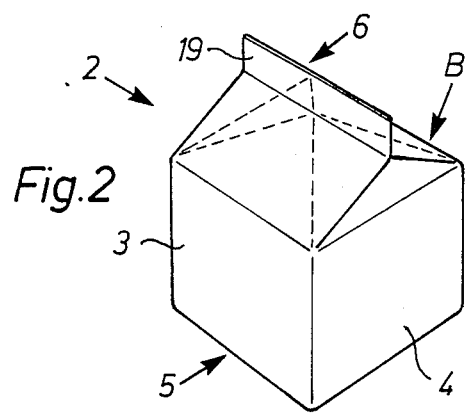
FIG. 2 is a perspective view of a packing container manufactured from the blank in closed condition.
Figure 3:
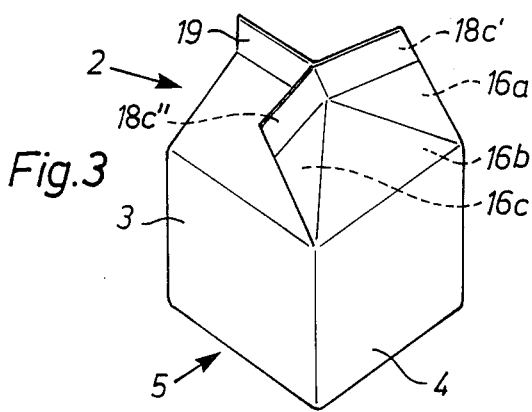
FIGS. 3 and 4 are perspective views of the same container illustrated in FIG. 2 at different stages during an opening procedure.
Figure 4:
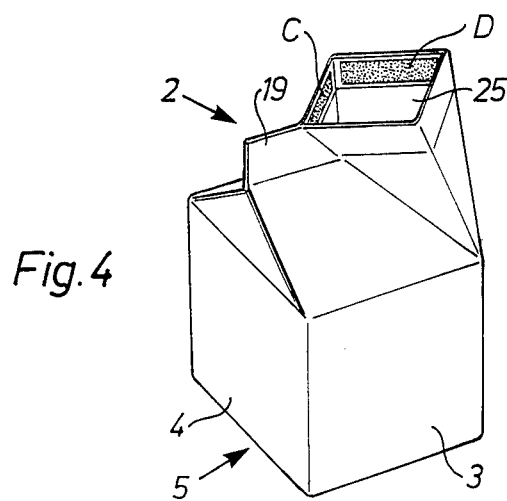

In FIG. 1 is shown a plane, substantially rectangular initial blank 1 for the manufacture of a packing container 2 of the type as shown in FIGS. 2–4, and which comprises four side walls 3,4, opposite in pairs, an arbitrary bottom closure 5 and a top closure 6 formed by bellow-type folding, in accordance with the present invention.

In order to facilitate the bellow-type folding in the manufacture of the container 2, the blank 1 has been provided with a suitable pattern of folding lines which in the example chosen here comprise two horizontal crease lines 8 and 9 and four vertical crease lines 10–13 commencing at the top edge 7 which intersect the horizontal crease lines 8 and 9 at right angles so as to form four connected, rectangular top closure panels 14–17 in the upper part of the blank 1. The top closure panels 14–17 are connected at the top to an edge zone 18, formed between the top edge 7 of the blank and the upper horizontal crease line 8, consisting of foldable parts 18a–18d, which is intended to form a top closure 6 on the sealing fin 19 holding together the finished container 2 (FIG. 2). The top closure panels 14–17 are connected further down, that is to say below the lower horizontal crease line 9, to the side wall panels 3', 4' forming the side walls 3,4 of the container which in turn change into bottom folding panels, outlined by a corresponding appropriate crease line pattern, for the bottom closure 5 of the container 2.

The top closure panel 16 is divided up into three smaller triangular panels 16a–16c, the tip 19 of the center triangular panel 16b being located at the central point of the upper horizontal line 8 between the vertical crease lines 12 and 13, whilst the edge zone part 18c connected to the top closure panel 16 is divided into two smaller parts 18c' and 18c'' which are foldable against each other along a vertical crease line 20 commencing from the central point 19. In a corresponding manner, the rectangular top closure panel 14 is divided up into three smaller triangular panels 14a–14c, the tip 21 of the center triangular panel 14b being located at the central point of the upper horizontal crease line 8 between the two vertical crease lines 10 and 11, whilst the foldable edge zone part 18a connected to the panel 14 is divided into two smaller parts 18a' and 18a'' which are foldable against each other along a vertical crease line 22 commencing from the central point 21.

In the manufacture of the container 2 in accordance with the invention shown in FIG. 2 the plane blank 1 is folded along the vertical crease lines 10–13 so as to form a tubular container body, an overlap lug 24 formed between the vertical crease line 10 and one lateral edge 23 of the blank being sealed against the inside of the panel 3' forming the adjacent side wall of the blank. The lower part of the container body subsequently is given an arbitrary bottom closure 5 by folding along the appropriate folding lines arranged in the lower part of the blank 1, whereafter the container thus closed at the bottom is filled with the desired contents, e.g. milk. The other end of the container body, the top part, is closed thereafter by bellow-type folding so as to form a ridge-like top closure 6 (FIG. 2) which below a sealing fin 19 formed by the folded edge zone 18 of the blank 1 possesses four rectangular end panels 14–17 connected to the edge zone, the end panels 15 and 17 whereof are inclined towards one another, whereas the two others, 14 and 16, are folded in under the sealing fin 19, with the tips 21 and 19 respectively of the two centre panels 14b and 16b being directed towards one another to form bellow-type folds, one of which is shown in FIG. 2 indicated by reference symbol B. The sealing fin 19 consequently for the greater part will comprise four of the material layers 18a–18d forming the edge zone 18 which thereafter are sealed to one another by so-called heat-sealing under pressure with simultaneous supply of heat.

When the container 2 is to be opened, the procedure as shown in FIGS. 3–4 is followed. This consists in that the parts 18c' and 18c'', folded against one another, are pulled apart with the help of a finger/thumb grip to the position shown in FIG. 3, whereafter a re-unfolding of the bellow-type folded top closure panel 16 is made possible to produce an emptying opening 25 in form of a pouring spout.

To facilitate this re-unfolding of the bellow-type folded top closure panel 16, certain portions (within the shaded areas C–F) in the part B' of the edge zone 18 forming the bellow-type fold B, have been coated, in accordance with the invention, with a seal-weakening composition comprising 85% sodium carboxymethyl cellulose and 15% polythene.

On coating in the manner as shown in FIG. 1 the composition is able to reduce the seal to a value of only approx. 25% of the seal which would be achieved without any coating of the shaded panels C–F in FIG. 1.

While this invention has been illustrated and described in accordance with a preferred embodiment, it is recognized that variations and changes may be made and equivalents employed herein without departing from the invention as set forth in the claims.

What is claimed is:

1. A packing container intended for liquid contents which is manufactured from a blank made up at least partly of thermoplastic-coated paper which has been provided with a pattern of folding lines facilitating the fold-forming, and which by folding has been formed to a tubular container body, one end of which has been given an arbitrary bottom closure and the other end of which has been closed by bellow-type folding to form a top closure which below a sealing fin, formed from a foldable edge zone of the blank, has four rectangular top closure panels connected to the edge zone, two of said panels lying opposite one another being inclined towards one another, the other two of said panels being divided up into three triangular panels each and being folded in below the sealing fin, with the other two of said panels including tips directed towards one another to form bellow-type folds, the sealing fin to the greater part comprising four material layers consisting of the edge zone, the thermoplastic-coated surfaces whereof, situated against one another, are joined to one another by a seal produced by means of pressure with simultaneous supply of heat, and where one of the top closure panels, thus folded to a bellow-type fold, is unfoldable to expose an emptying opening in the form of a pouring spout by breaking open the seal joining the material layers within an area of the sealing fin located above the said bellow-type fold, wherein the plastic surfaces facing one another are covered at least partially with a seal-weakening composition within the area of the sealing fin intended for breaking open, and that this composition contains a thermoplastics material which is modified by a carboxymethyl cellulose.

2. A packing container in accordance with claim 1, wherein the composition comprises sodium carboxymethyl cellulose in a quantity of 60–95%, calculated on the total dry substance weight of the composition, and correspondingly 40–5% polyethylene.

* * * * *